2 Sheets—Sheet 1.
F. FLYNN.
Manufacture of Rubber-Boots.
No. 217,087. Patented July 1, 1879.
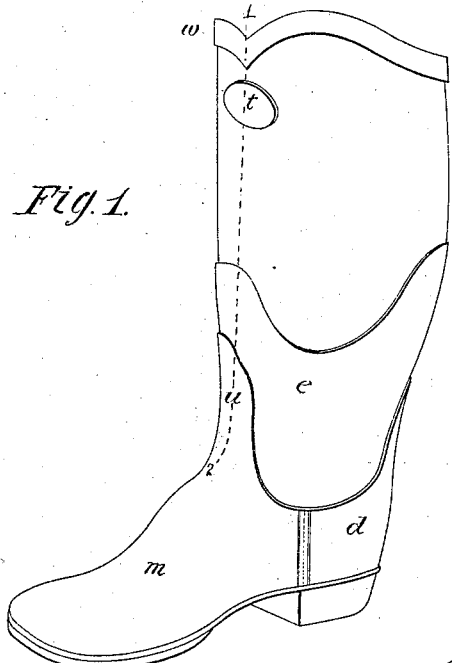
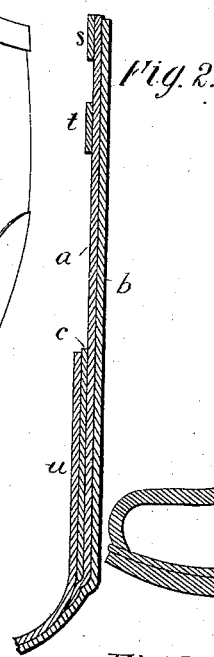
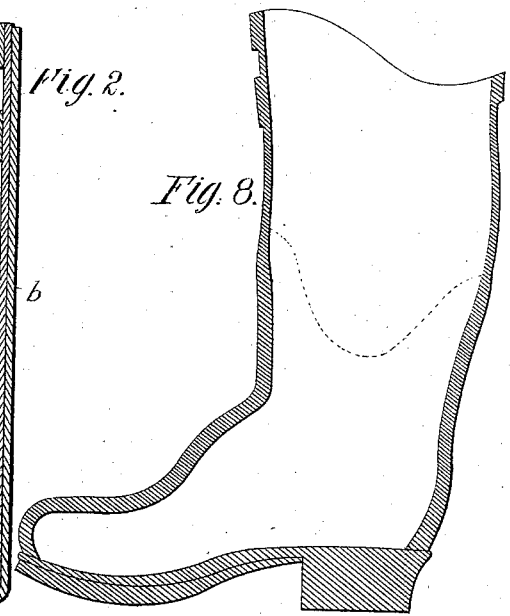
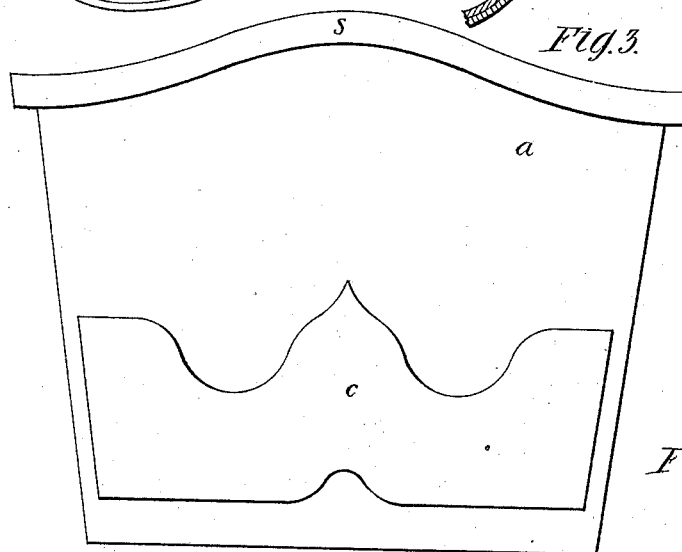
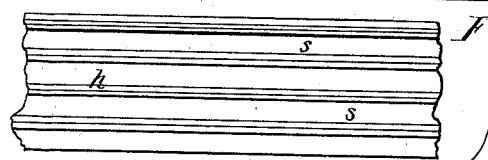
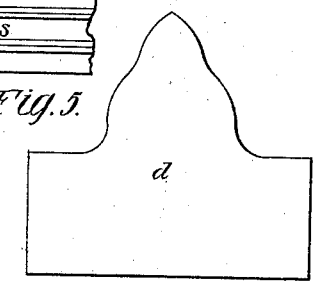
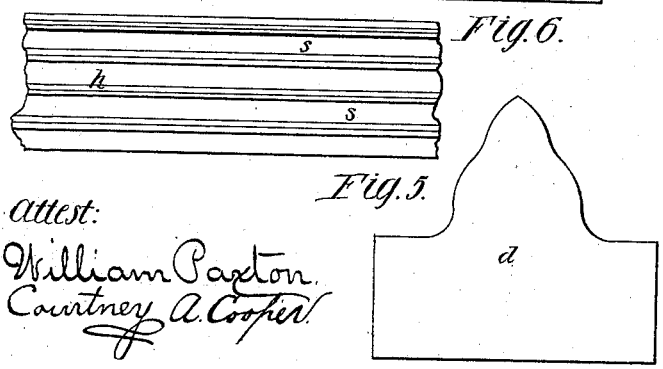
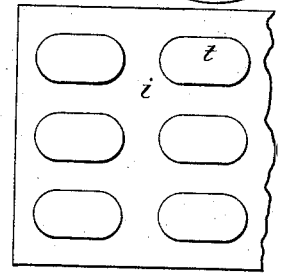
Attest:
William Paxton
Courtney A. Cooper
Inventor
Francis Flynn
By his attorney
Charles E. Foster 2 Sheets—Sheet 2.
F. FLYNN.
Manufacture of Rubber-Boots.
No. 217,087. Patented July 1, 1879.
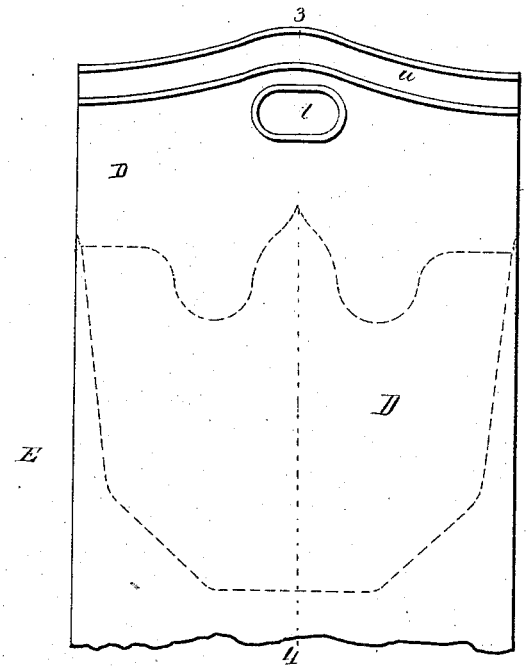
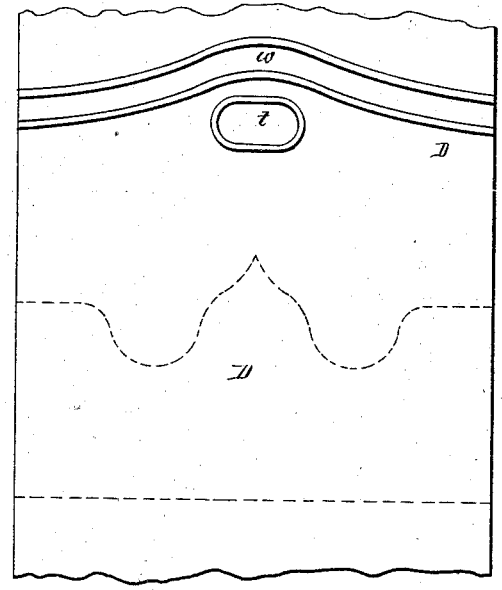
Attest:
William Parton
Courtney A. Cooper
Inventor:
Francis Flynn
By his attorney
Charles E. Foster

UNITED STATES PATENT OFFICE.

FRANCIS FLYNN, OF WOONSOCKET, RHODE ISLAND, ASSIGNOR TO WOONSOCKET RUBBER COMPANY.

IMPROVEMENT IN MANUFACTURE OF RUBBER BOOTS.

Specification forming part of Letters Patent No. 217,087, dated July 1, 1879; application filed March 22, 1879.

*To all whom it may concern:*

Be it known that I, FRANCIS FLYNN, of Woonsocket, Providence county, Rhode Island, have invented Improvements in the Manufacture of Rubber Boots, of which the following is a specification.

The object of my invention is to avoid the manipulation and expense incident to the ordinary mode of making rubber boots, and to produce a cheaper and more durable article.

In the drawings, forming a part of this specification, Figure 1 is a view illustrating a boot made in the usual manner; Fig. 2, an enlarged section on the line 1 2, Fig. 1; Figs. 3 to 7, views showing the pieces used in forming the leg of the ordinary boot; Fig. 8, a section showing the improved boot; Fig. 9, a view showing the shape of a piece from which the improved boot may be made; Fig. 10, a section on the line 3 4, Fig. 9; and Fig. 11, a modification.

In all rubber boots there are parts which require to be stronger and more durable than others, and this increased strength and durability are secured by an increase in the thickness of the material, constituting the outer rubber coating at the parts subject to the greatest amount of wear, the others being made as thin as possible, to reduce the weight. Heretofore in the manufacture of such boots the additional thickness at any point has been secured by the application upon the boot-tree of several superposed layers or sheets of the rubber composition. For instance, in forming the leg, a sheet of coating-rubber, *a*, Figs. 2 and 3, is applied to the fabric *b* upon the tree or mold, and upon the lower part of the sheet is applied a smaller piece of composition, *c*, of the shape and in the position shown in Fig. 3, forming the increased thickness at the part *e* of the leg, Fig. 1. The heel is then thickened by the application of a counter-piece, *d*, and another piece, *m*, is applied, forming the vamp, a tongue, *u*, overlapping the lower part of the leg.

An ornamental strip, *s*, is then applied at the upper edge, forming the thickened-edge binding-rib *w*, and the maker's label, *t*, is placed in position at any desired point. When thus combined and arranged on the tree the several pieces are then vulcanized together.

There are two serious objections to this mode of manufacture: First, the abrupt shoulders consequent on the increase of thickness along the edges of the different pieces cause the boot to fold or bend mainly at these points, and finally to break; second, there are numerous separate operations, and much expense is thereby incurred. Three sheets—one from which to cut the body and pieces *c d m;* one, *h*, from which to cut the strips *s*, and one, *i*, from which to cut the maker's label, *t*—have to be formed. Each must be cut, the pieces must be often manipulated, and finally all applied in relative position.

I overcome these objections by first forming one sheet, E, of rubber composition with embossed sections D, of such form that when applied to the tree they will constitute the entire vamp, counter, and leg, each section being thickest at those portions which constitute the vamp and counter, and being embossed at the upper edge and in front to form the border rib *w* and maker's label *t*.

In order to prevent the breaking before alluded to, the thick and thin portions merge gradually into each other, thus leaving no abrupt shoulders, so that the boot will not bend at single points, as heretofore, but in long curves, which do not impair the fabric.

Each section or blank is cut from the strip and applied to the lining on the tree with as little loss of time as is required to apply only the first layer in the ordinary mode of manufacture, thus avoiding a great proportion of the labor, manipulation, waste, and time heretofore required, while the article produced is much cheaper and more durable.

The boot is not necessarily made in a single piece. For instance, it may be made of two sections folded to form the seams at the sides, or the leg may be made of one piece molded and cut to the form shown in Fig. 11, the vamp and heel being made of separate sections; but in each case the sections are molded of varying thickness, the thicker portions gradually merging into the thinner parts, as described.

I claim—

A rubber boot having thick portions at the vamp and heel and thinner at the leg, of one or more pieces of rubber composition, the thick portions gradually merging into the thin portions without abrupt shoulders, as set forth.

In testimony whereof I have signed my name to this specification in the presence of two subscribing witnesses.

FRANCIS FLYNN.

Witnesses:
H. A. FOLLETT,
H. C. MASON.